UNITED STATES PATENT OFFICE.

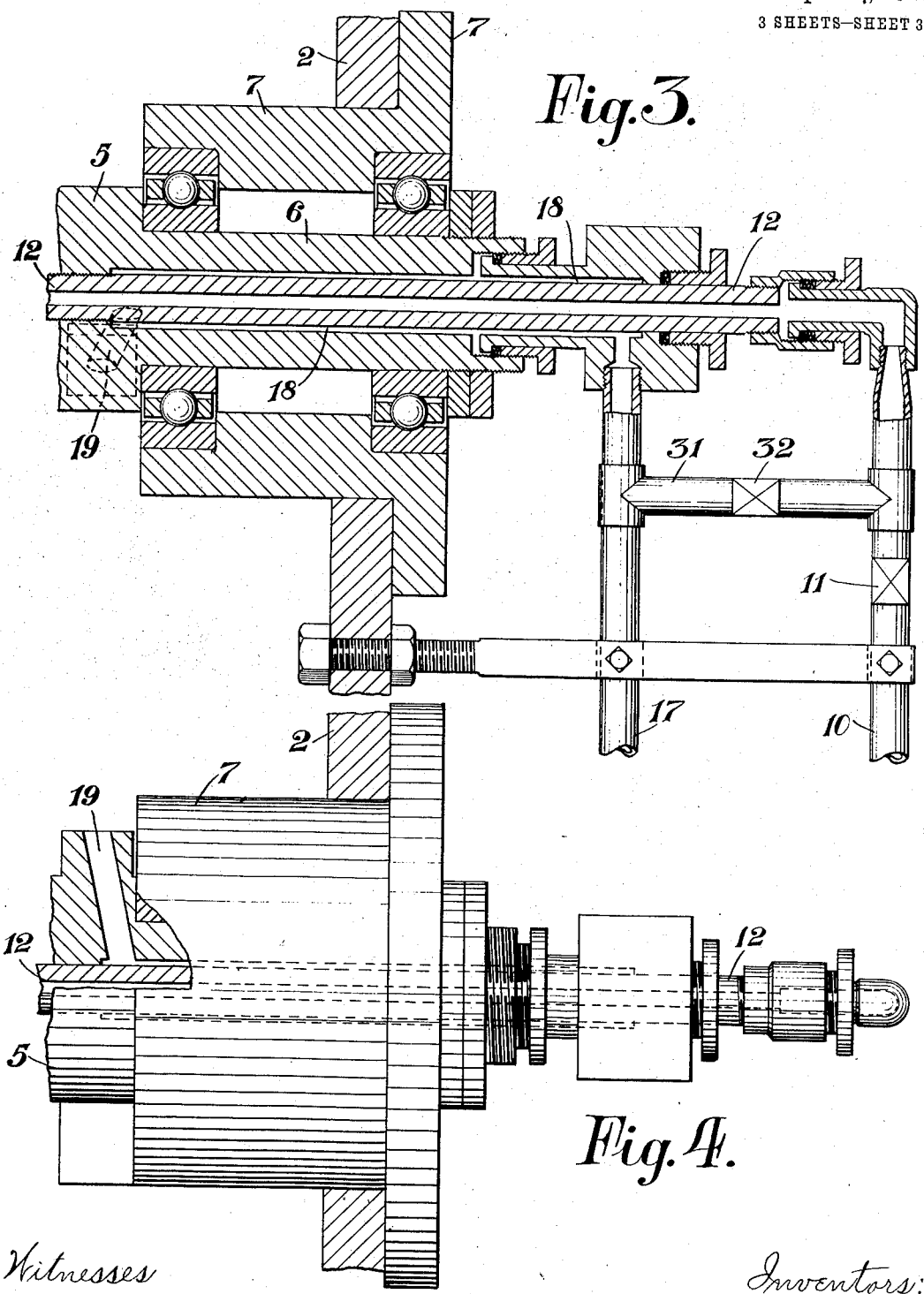

FREDERICK WILLIAM KNOWLES AND GEORGE WILLIAM INMAN, OF THORNHILL LEES, NEAR DEWSBURY, ENGLAND.

MACHINE FOR MANUFACTURING GLASS BOTTLES, JARS, AND THE LIKE.

1,003,471. Specification of Letters Patent. Patented Sept. 19, 1911.

Application filed February 4, 1911. Serial No. 606,638.

*To all whom it may concern:*

Be it known that we, FREDERICK WILLIAM KNOWLES and GEORGE WILLIAM INMAN, subjects of the King of Great Britain, residing at Thornhill Lees, near Dewsbury, in the county of York, England, have invented certain new and useful Improvements in Machines for Manufacturing Glass Bottles, Jars, and the Like; and we do hereby declare the following to be a full, clear, and exact description of the invention, such as will enable others skilled in the art to which it appertains to make and use the same.

In machines for manufacturing glass bottles, jars and the like, of the type in which the parison mold is carried in a turnover bracket, and its two halves are connected by levers to the piston of an air cylinder, to which cylinder compressed air is admitted for actuating the said levers to open and close the said mold, it has hitherto been customary to supply the air to the cylinder and that for blowing the bottle through the same pipe, and therefore at the same pressure. The pressure necessary to actuate the parison mold is found to be excessive for blowing the bottle, frequently causing the bottle to shiver or crinkle.

According to this invention we provide the machine with separate air supplies at different pressures for the mold and cylinder respectively. The bore of the rotary journal of the turnover bracket may be connected direct to the air cylinder and to a pipe supplying air at, say, 18 or 20 lbs. above atmospheric pressure, while a tube concentric with the said journal and within this high pressure air space may be connected to the plunger casing and to a pipe supplying air at, say 4 or 5 lbs. above atmospheric pressure, suitable stuffing boxes being provided. These pressures are merely mentioned by way of example, as any desired pressures may be used.

In order that our said invention may be clearly understood, we will now proceed to describe an example of the application thereof to machines of the type described in the specification of the previous Patent No. 957349 granted to the present applicants.

Figure 1:
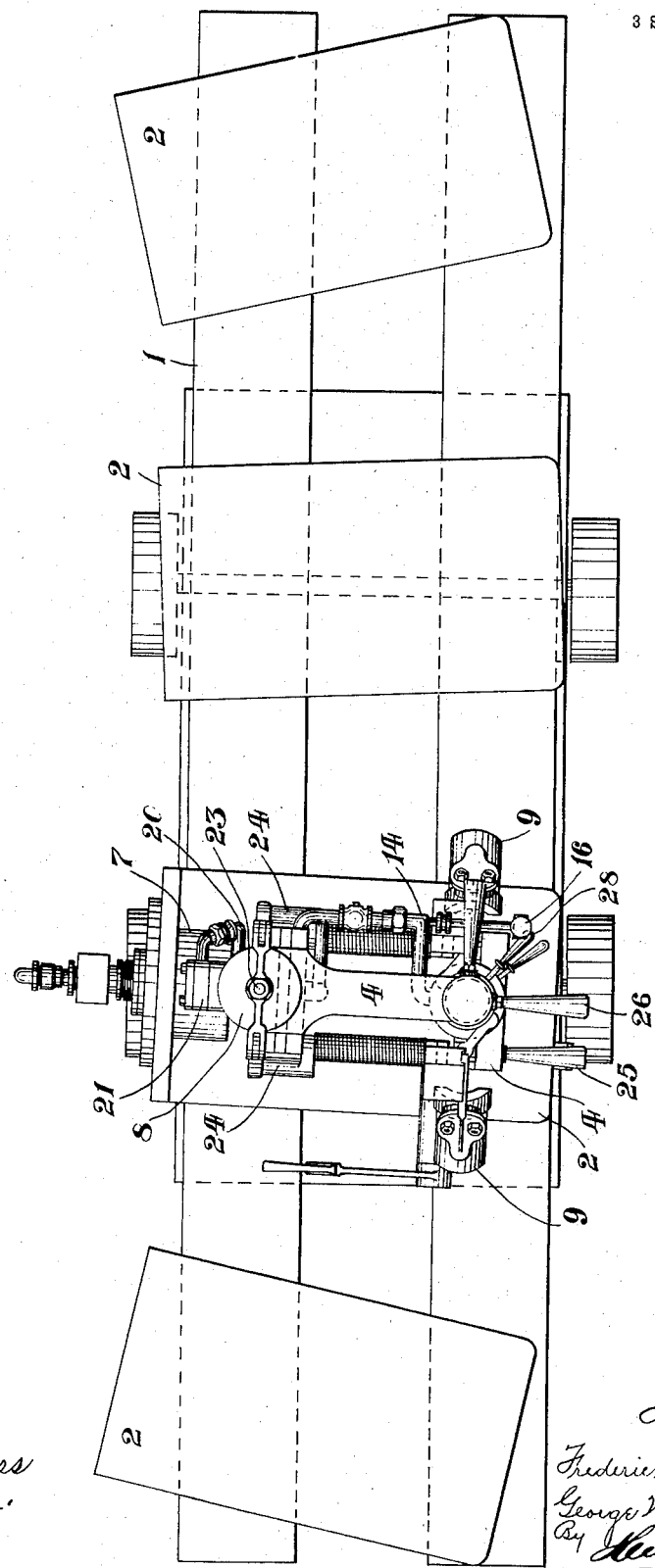
Figure 2:
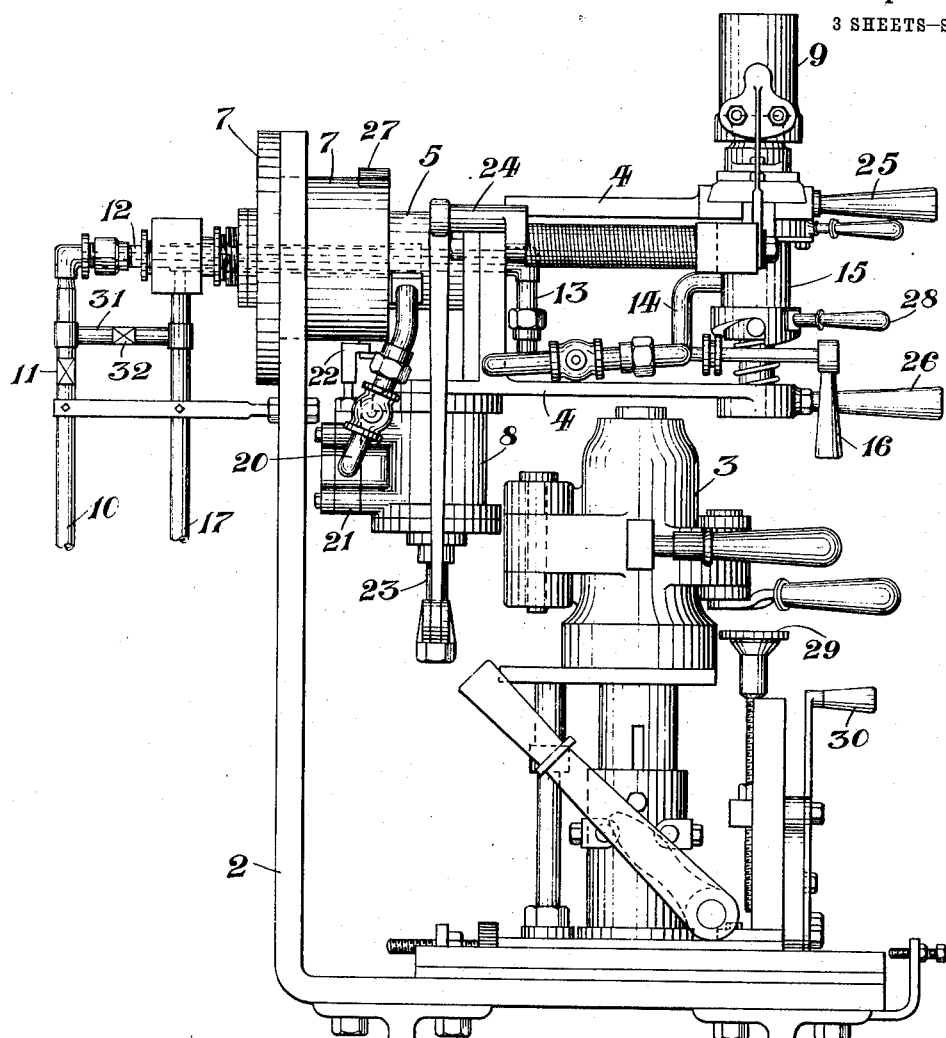

Figure 1 is a plan of such a machine forming one of a set of four on a carriage, the remaining three machines of the set being indicated in outline only. Fig. 2 is a side elevation on a larger scale of the said machine. Fig. 3 is a sectional elevation on a further enlarged scale of the air supplying arrangements. Fig. 4 is a plan corresponding to Fig. 3 and partly in section.

The reference numeral 1 indicates the carriage on which four or other number of machines 2, each comprising a finishing mold 3 with its appurtenances, may be mounted. The machines may of course be fixed to the floor singly, back to back, in threes, or otherwise arranged independently of the carriage, or on a carriage of a different form.

The "turnover motion" as usual comprises a framework 4 connected to a boss 5 on the end of a tube or sleeve 6 working in ball bearings in a flanged boss 7 which passes through and is secured to the framework of the machine 2, this framework 4 carrying an air cylinder 8, parison mold 9, connections between the said cylinder and parison mold whereby the two halves of the parison mold are automatically separated upon the framework being turned over so as to invert the said cylinder and mold, a plunger adapted to enter the said mold, means for supplying air to the cylinder and air for blowing the bottle, means for operating the plunger and handles for rotating the framework. The present invention is only concerned with the air supplies.

The low pressure air from any convenient source is led through a tube 10 controlled by a valve 11 into a tube 12 (shown clearly in Fig. 3) passing through the sleeve 6 and boss 5 to a pipe 13 (Fig. 2) communicating with a pipe 14 (Figs. 1 and 2) which enters the shell or casing 15 of the plunger. The rear end of the pipe 14 is blocked, and merely serves for the attachment of the pipe to the framework 4. A handle 16 actuates a valve in the pipe 14. The high pressure air from any convenient source is led through a tube 17 to the annular space 18 surrounding the tube 12, thence through an inclined passage 19 (Figs. 3 and 4) to a pipe 20 (Figs. 1 and 2) entering the casing 21 of a double-acting valve controlling upper and lower ports in the cylinder 8.

The action of the turnover mechanism is as follows:—With the parts in the position shown in Fig. 2, the stem 22 of the valve, which stem is L shaped at its outer extremity, is engaged and held up by a claw or socket on the fixed boss 7, so that air enters the lower part of the cylinder 8 and keeps up the piston therein; the piston rod 23 is linked to cranked levers 24, which levers keep the parison closed. The parison having been charged, the workman pushes the handle 25 to his right and the handle 26 to his left, rotating the tubes 6 and 12 to the extent of half a revolution and bringing the parison 9 down, and the air cylinder up into the position indicated in Fig. 1. As the cylinder rises, the foot or extremity of the valve stem 22 engages an incline or cam surface 27 on the fixed boss 7, which presses in the valve stem and causes air to be admitted to the other side of the piston, forcing out the piston rod 23 and rocking the levers 24 so that the two halves of the parison separate. The plunger is then lifted out of the bottle neck by means of the handle 28, the paddle 29 operated by means of the handle 30, the finishing mold 3 closed, the handle 16 operated to let air pass the plunger to blow the bottle, the ring mold and finishing mold opened, and the bottle removed. The fixed high and low pressure pipes may be connected to each other by a cross pipe 31 comprising a valve 32 which is normally closed; but this valve being opened and the inlet valve 11 of the low pressure pipe 10 closed, the higher pressure air can be used both for working the parison mold and for blowing the bottle, if the metal be at any time too stiff for molding at the lower pressure.

We claim as our invention:—

1. A glass blowing machine comprising a rotatable frame, a divisible parison mold and an air cylinder mounted on the frame, mechanism operated from the cylinder for separating the mold, an air supply pipe connected with the blowing shell of the mold, a pressure pipe communicating with an annular passage formed in the journal of the frame, and conduits connecting the annular passage with the air cylinder.

2. A glass blowing machine comprising a rotatable frame, a divisible parison mold and an air-cylinder mounted on the frame, mechanism operated from the cylinder for separating the mold, a valve controlled pipe connected with the blowing shell of the mold, a low pressure pipe communicating with the valve controlled pipe, a high pressure pipe communicating with an annular passage formed in the journal of the frame, and conduits connecting the annular passage with the air cylinder.

3. A glass blowing machine comprising a rotatable frame, a divisible parison mold and an air-cylinder mounted on the frame, mechanism operated from the cylinder for separating the mold, a valve controlled pipe connected with the blowing shell of the mold, a low pressure pipe communicating with the valve controlled pipe, a high pressure pipe communicating with an annular passage formed in the journal of the frame, conduits connecting the annular passage with the air cylinder, a cross pipe connecting the low and high pressure pipes, a valve in the cross pipe, and a valve in the low pressure pipe below said cross pipe.

4. A glass blowing machine comprising a rotatable frame, a divisible parison mold mounted thereon embodying a blowing shell, an air cylinder mounted on the frame, mechanism operated from the cylinder for separating the mold, a valve casing on the cylinder, a journal for said frame, a tube in the journal forming an annular passage in the latter, a valve controlled pipe connecting said tube with said blowing shell, a low pressure pipe connected to said tube, a high pressure pipe communicating with the annular passage, and conduits connecting the latter with the valve casing.

5. A glass blowing machine, comprising a rotatable frame, a divisible parison mold mounted thereon embodying a blowing shell, an air cylinder mounted on the frame, mechanism operated from the cylinder for separating the mold, a valve casing on the cylinder, a journal for said frame, a tube in the journal forming an annular passage in the latter, a valve controlled pipe connecting said tube with said blowing shell, a low pressure pipe connected to said tube, a high pressure pipe communicating with the annular passage, conduits connecting the latter with the valve casing, a valve controlled cross pipe connecting the high and low pressure pipes, and a valve in the low pressure pipe below the cross pipe.

In testimony whereof we affix our signatures, in presence of two witnesses.

FREDERICK WILLIAM KNOWLES.
GEORGE WILLIAM INMAN.

Witnesses:
ERNEST PRIESTLEY NEWTON,
JOSEPH LANCASTER FLEMMING.